United States Patent
Matsuo

(10) Patent No.: US 9,482,533 B2
(45) Date of Patent: Nov. 1, 2016

(54) VIBRATING REED, ANGULAR VELOCITY SENSOR, ELECTRONIC DEVICE, AND MOVING OBJECT

(71) Applicant: Seiko Epson Corporation, Tokyo (JP)

(72) Inventor: Atsushi Matsuo, Okaya (JP)

(73) Assignee: Seiko Epson Corporation (JP)

(*) Notice: Subject to any disclaimer, the term of this patent is extended or adjusted under 35 U.S.C. 154(b) by 190 days.

(21) Appl. No.: 14/526,866

(22) Filed: Oct. 29, 2014

(65) Prior Publication Data

US 2015/0114126 A1    Apr. 30, 2015

(30) Foreign Application Priority Data

Oct. 30, 2013 (JP) ................. 2013-226032

(51) Int. Cl.
*G01D 21/00* (2006.01)
*G01C 19/5607* (2012.01)

(52) U.S. Cl.
CPC ................. *G01C 19/5607* (2013.01)

(58) Field of Classification Search
CPC .. H03H 9/21; H01L 41/047; G01C 19/5607; Y10T 29/42
See application file for complete search history.

(56) References Cited

U.S. PATENT DOCUMENTS

| | | | | |
|---|---|---|---|---|
| 5,343,749 A * | 9/1994 | Macy | ................. | G01C 19/5607 73/504.16 |
| 6,898,832 B2 * | 5/2005 | Kawashima | ......... | H03H 9/1021 29/25.35 |
| 7,165,452 B2 * | 1/2007 | Kobayashi | ............... | G01G 3/16 73/580 |
| 7,673,511 B2 * | 3/2010 | Yamamoto | ......... | G01C 19/5607 310/370 |
| 7,802,473 B2 * | 9/2010 | Endo | .................. | G01C 19/5607 73/504.16 |
| 7,872,404 B2 * | 1/2011 | Numata | .................... | H03B 5/30 310/348 |
| 8,191,216 B2 * | 6/2012 | Yamazaki | ................. | H03H 3/04 216/41 |
| 8,373,333 B2 * | 2/2013 | Yamada | ............. | H03H 9/02062 310/368 |
| 8,633,637 B2 * | 1/2014 | Nishizawa | ......... | G01C 19/5628 310/370 |
| 9,347,776 B2 * | 5/2016 | Nishizawa | ......... | G01C 19/5607 |
| 2005/0081635 A1 * | 4/2005 | Kobayashi | ............... | G01G 3/16 73/580 |
| 2011/0140575 A1 | 6/2011 | Nishizawa | | |
| 2011/0163638 A1 * | 7/2011 | Yoshida | ............... | H03H 9/1021 310/348 |
| 2012/0103095 A1 | 5/2012 | Wada et al. | | |
| 2012/0126664 A1 | 5/2012 | Ogura et al. | | |
| 2012/0326570 A1 * | 12/2012 | Nishizawa | ............... | H03H 3/02 310/366 |
| 2015/0114116 A1 * | 4/2015 | Matsuo | .................... | H03H 9/21 73/504.16 |

FOREIGN PATENT DOCUMENTS

| | | |
|---|---|---|
| JP | 2001-221638 A | 8/2001 |
| JP | 2011-141266 A | 7/2011 |
| JP | 2012-098091 A | 5/2012 |
| JP | 2012-112748 A | 6/2012 |

* cited by examiner

*Primary Examiner* — Laura Martin
*Assistant Examiner* — Samir M Shah
(74) *Attorney, Agent, or Firm* — Harness, Dickey & Pierce, P.L.C.

(57) ABSTRACT

The vibrating reed includes a first main surface and a second main surface that face each other in the thickness direction of a piezoelectric body and a detection unit that vibrates along the thickness direction when detecting. The detection unit includes a groove of which a groove bottom is positioned at a position beyond a midline between the first main surface and the second main surface in the depth direction from an opening formed in the first main surface, an inside surface electrode that is formed on an inside surface facing the inside of the groove, an outside surface electrode that is formed on an outside surface which is opposite the inside surface with the piezoelectric body interposed therebetween, and a pair of groove bottom electrodes that is provided further on the groove bottom at an interval than the midline and face inside the groove.

18 Claims, 10 Drawing Sheets

VIBRATING REED, ANGULAR VELOCITY SENSOR, ELECTRONIC DEVICE, AND MOVING OBJECT

BACKGROUND

1. Technical Field

The present invention relates to a vibrating reed, an angular velocity sensor, an electronic device, and a moving object.

2. Related Art

Generally, vibrating reeds have been used in angular velocity sensors (gyro sensors) (FIG. 1 of JP-A-2012-098091 and JP-A-2012-112748). In FIG. 1 of JP-A-2012-098091, for example, when an angular velocity motion about the Y axis is applied to a vibrating reed extending in the Y direction, a drive unit that is subjected to an in-plane vibration in the X direction in the X-Y plane is then changed to be subjected to an out-of-plane vibration in the Z axis direction (the thickness direction of the vibrating reed) by the action of the Carioles force. The component of the force in the Z direction causes a detection unit to move. By such a component of the force, an electric field is generated in the X direction in the detection unit by the piezoelectric effect. Based on the electric field, the detection unit outputs an output signal; hence, the angular velocity is detected.

As a vibrating reed used in a gyro sensor, a technology is proposed in which a groove (an interference prevention portion) that is open to a side surface of a detection unit and in which the depth direction thereof is set in the X direction is provided in the detection unit (FIG. 4 of JP-A-2001-221638). The groove is arranged to prevent the electrical coupling interference between a pluralities of electrodes provided on outside surfaces of the detection unit without including electrodes on the inside surface or the groove bottom thereof. This suppresses the occurrence of leakage voltage.

As another vibrating reed used in a gyro sensor, a technology is proposed in which a step portion is formed on side surfaces of a detection unit, and the distance in the X direction between a pair of electrodes formed on both side surfaces of the detection unit is narrowed so as to improve the efficiency of the electric field (FIG. 3 of JP-A-2011-141266).

When the area of electrodes arranged in a detection unit is narrowed along with the miniaturization of gyro sensors, the electric field in the X direction generated in response to the component of the force becomes weaker; and thus, the detection sensitivity decreases. It is considered to enlarge the area of the electrodes by providing a groove that is open to a main surface of the detection unit unlike in FIG. 4 of JP-A-2001-221638 and FIG. 3 of JP-A-2011-141266. However, electric charge loss may apparently occur when the position of formation of electrodes is not considered in a case where the detection unit of a vibrating reed vibrates along the thickness direction thereof such as in gyro sensors.

SUMMARY

An advantage of some aspects of the invention is to provide a vibrating reed in which the area of electrodes can be enlarged, and the detection sensitivity can be improved by increasing the efficiency of an electric field even when the vibrating reed is miniaturized; an angular velocity sensor; an electronic device; and a moving object.

(1) An aspect of the invention relates to a vibrating reed including a first main surface and a second main surface of a piezoelectric body, the second main surface being on a back surface of the piezoelectric body with respect to the first main surface; an outside surface that connects the first main surface and the second main surface; and a detection unit that vibrates in a direction intersecting the first main surface in which the detection unit includes a groove of which a groove bottom is at a position beyond a midline between the first main surface and the second main surface in a depth direction from an opening provided in the first main surface, an inside surface electrode that is provided on an inside surface facing the inside of the groove, an outside surface electrode that is provided on the outside surface, and a pair of groove bottom electrodes that is provided further on the groove bottom side than the midline at an interval and face inside the groove.

In the configuration of the aspect of the invention, a compressive force is applied to one of two areas divided from each other by the midline in the thickness direction, and a tensile force is applied to the other of the two areas in the detection unit that vibrates along the thickness direction (for example, the Z direction) intersecting the first main surface. The midline here is a plane where none of compression and tension occurs. Electric fields generated in response to the compressive force or the tensile force act in the pair of electrodes formed in the detection unit. At this time, the direction of the electric field caused by the compressive force is opposite to the direction of the electric field caused by the tensile force.

The deepest position of the groove from the opening is referred to as the groove bottom in this specification. The groove bottom, as the bottom of the groove, can be a flat surface or not a flat surface. The reason is that the bottom of the groove is not always formed to be flat but can be V-shaped when processed with etching, particularly wet etching. Given that a first direction (for example, the +X direction) is the direction of a first electric field generated in the pair of side surface electrodes (the inside surface electrode-the outside surface electrode) in the horizontal cross section (for example, the X-Z plane) of the detection unit that is orthogonal to the longitudinal direction (for example, the Y direction) of the detection unit, the direction of a second electric field generated in the pair of groove bottom electrodes is a second direction (for example, the −X direction) that is opposite to the first direction.

When the inside surface electrode is positioned downstream of the first electric field, the groove bottom electrode of the pair of groove bottom electrodes that is close to the inside surface electrode is positioned downstream of the second electric field. Similarly, when the inside surface electrode is positioned upstream of the first electric field, the groove bottom electrode of the pair of groove bottom electrodes that is close to the inside surface electrode is positioned upstream of the second electric field. Accordingly, even when the groove bottom electrode of the pair of groove bottom electrodes that is close to the inside surface electrode is connected to the inside surface electrode, two connected electrodes are together positioned downstream or upstream of the direction of the electric fields. Therefore, electric charge loss caused by the electric fields does not occur. Accordingly, the area of electrodes can be enlarged by the electrodes formed on the inside surface and the groove bottom of the groove. Furthermore, detection sensitivity can be improved since electric charge does not occur.

(2) In the aspect of the invention the vibrating reed may further include a first inside surface electrode and a first outside surface electrode that are respectively provided on the first inside surface and the first outside surface, and a second inside surface electrode and a second outside surface electrode that are respectively provided on the second inside surface and the second outside surface; the outside surface includes a first outside surface and a second outside surface; the inside surface includes a first inside surface that is provided on one side of the groove in a width direction and a second inside surface that is provided on the other side of the groove; the piezoelectric body be included between the first outside surface and the first inside surface; the piezoelectric body be included between the second outside surface and the second inside surface; and the pair of groove bottom electrodes includes a first groove bottom electrode and a second groove bottom electrode that are respectively connected to the first inside surface electrode and the second inside surface electrode.

With this configuration, in the horizontal cross section (for example, the X-Z plane) of the detection unit that is orthogonal to the longitudinal direction (for example, the Y direction) of the detection unit, the direction of the first electric field generated in the first pair of side surface electrodes (the first inside surface electrode-the first outside surface electrode) and the second pair of side surface electrodes (the second inside surface electrode-the second outside surface electrode) is the same first direction (for example, the +X direction). Meanwhile, the direction of the second electric field generated in the pair of groove bottom electrodes is the second direction (for example, the −X direction) that is opposite to the first direction.

Accordingly, the first inside surface electrode and the first groove bottom electrode that are respectively positioned, for example, downstream of the first and the second electric fields are connected to each other, and the second inside surface electrode and the second groove bottom electrode that are respectively positioned, for example, upstream of the first and the second electric fields are connected to each other. Therefore, electric charge loss caused by the electric fields does not occur; and thus, the area of electrodes can be enlarged by the electrodes formed on the inside surface and the groove bottom of the groove. Furthermore, detection sensitivity can be improved since electric charge loss does not occur.

(3) In the aspect of the invention, at least one of the first outside surface electrode and the second outside surface electrode may be provided in an area from the first main surface to the midline.

With this configuration, counter electrodes are not formed across the two areas divided from each other by the midline in at least one of the first pair of side surface electrodes and the second pair of side surface electrodes. Accordingly, the electric field generated in at least one of the first pair of side surface electrodes (the first inside surface electrode-the first outside surface electrode) and the second pair of side surface electrodes (the second inside surface electrode-the second outside surface electrode) has one direction, and electric charge loss does not occur. Therefore, detection sensitivity can be improved.

(4) In the aspect of the invention, the first outside surface electrode may be connected to the second inside surface electrode, and the second outside surface electrode be connected to the first inside surface electrode.

With this configuration, the second outside surface electrode and the first inside surface electrode that are connected to each other are positioned downstream of the direction of the electric field when the first outside surface electrode and the second inside surface electrode that are connected to each other are positioned, for example, upstream of the direction of the electric field. Accordingly, signals can be detected without electric charge loss caused by the electric field.

(5) In the aspect of the invention, the detection unit may further include a first main surface electrode and a second main surface electrode that are formed on the second main surface at an interval, the first main surface electrode be connected to the first groove bottom electrode, and the second main surface electrode be connected to the second groove bottom electrode.

With this configuration, since the pair of main surface electrodes and the pair of groove bottom electrodes are positioned on one side of the midline, the direction of the electric field generated therein during detection is the same. Accordingly, electric charge loss does not occur even when the first main surface electrode and the second main surface electrode are respectively connected to the first groove bottom electrode and the second groove bottom electrode.

(6) In the aspect of the invention, the detection unit may further include a third outside surface electrode that is provided in an area in the first outside surface from the midline to the second main surface and is connected to the first main surface electrode and a fourth outside surface electrode that is provided in an area in the second outside surface from the midline to the second main surface and is connected to the second main surface electrode.

With this configuration, since a third pair of side surface electrodes (the third outside surface electrode-the fourth outside surface electrode), the pair of main surface electrodes (the first main surface electrode-the second main surface electrode), and the pair of groove bottom electrodes are positioned on one side of the midline, the direction of the electric field generated therein during detection is the same. Accordingly, electric charge loss does not occur even with the conduction relationship described above.

(7) In the aspect of the invention, each of the first outside surface electrode and the second outside surface electrode may be a ground electrode.

With this configuration, the first outside surface electrode and the second outside surface electrode can shield the first inside surface electrode, the second inside surface electrode, and the pair of groove bottom electrodes; and thus, adverse effects from external noise can be reduced.

(8) Another aspect of the invention relates to an angular velocity sensor including the vibrating reed according to any one of (1) to (7) described above and a detection circuit that detects an angular velocity on the basis of a vibration of the vibrating reed along a direction intersecting the first main surface.

According to this angular velocity sensor, angular velocity detection sensitivity of the angular velocity sensor can be improved without electric charge loss.

(9) Still another aspect of the invention relates to an electronic device including the angular velocity sensor according to (8) described above.

(10) Yet another aspect of the invention relates to a moving object including the angular velocity sensor according to (8) described above.

According to the electronic device and the moving object of the aspects of the invention, the electronic device and the moving object can be further miniaturized even with detection sensitivity thereof maintained or improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings. The present embodiment described below does not intend to limit the content of the invention described in the appended claims. It can be said that all of configurations described in the present embodiment are not essential for the solution of the invention.

1. Overview of Vibrating Reed

Figure 1:
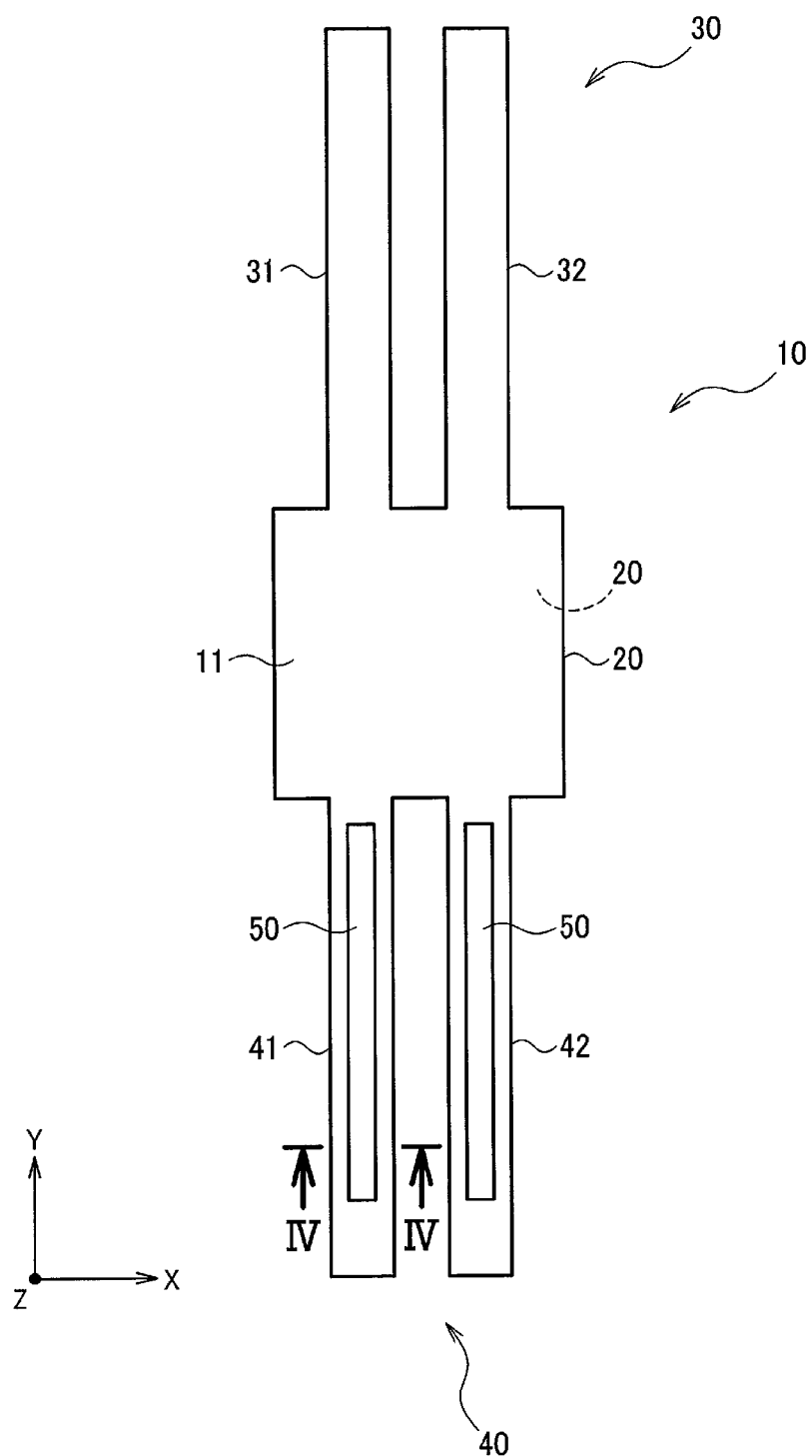
FIG. 1 is a plan view schematically illustrating a vibrating reed before electrodes is formed therein.

FIG. 1 schematically illustrates a vibrating reed 10 before electrodes are formed therein. The vibrating reed 10 of the present embodiment extends in the X-Y plane formed by the X axis (a second axis) and the Y axis that is orthogonal to the X axis on a plane and has a first main surface 11 and a second main surface 12 that face each other. The Z axis is defined to be an axis that is perpendicular to the first main surface 11 and the second main surface 12. The X axis is an electrical axis, the Y axis is a mechanical axis, and the Z axis is an optical axis when a piezoelectric body that forms the vibrating reed 10 is a quartz crystal. The vibrating reed 10 includes a drive unit 30 that extends in the +Y direction from a base portion 20 and a detection unit 40 that extends in the −Y direction from the base portion 20. In addition, as disclosed in JP-A-2012-112748, additional structures such as adjustment units (vibrating arms and electrodes for adjustments) that adjust suppression of leakage output may be provided in the vibrating reed 10.

The drive unit 30 includes a first vibrating arm 31 and a second vibrating arm 32. The base portion 20, the first vibrating arm 31, and the second vibrating arm 32 constitute a tuning-fork vibrating reed. The detection unit 40 includes a third vibrating arm 41 and a fourth vibrating arm 42. The base portion 20, the third vibrating arm 41, and the fourth vibrating arm 42 constitute a tuning-fork vibrating reed as above. These two tuning-fork vibrating reeds are coupled with the base portion 20. The vibrating reed 10 having such a configuration is called an H-shaped vibrating reed.

Figure 2:
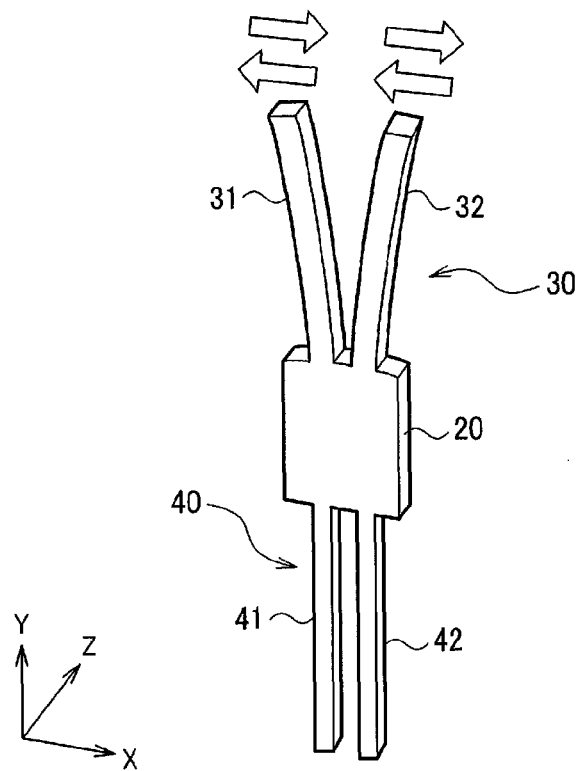
FIG. 2 is an operational diagram illustrating an in-plane vibration of a drive unit of the vibrating reed.

The vibrating reed 10 can be used as a gyro sensor (angular velocity sensor). As illustrated in FIG. 2, a vibration is driven to be excited in the drive unit 30 (the first and the second vibrating arms 31 and 32) when an angular velocity is detected. The vibration driven at this time is an in-plane vibration along the X direction in the X-Y plane. The first and the second vibrating arms 31 and 32 repeatedly vibrate while approaching to or receding from each other.

Figure 3:
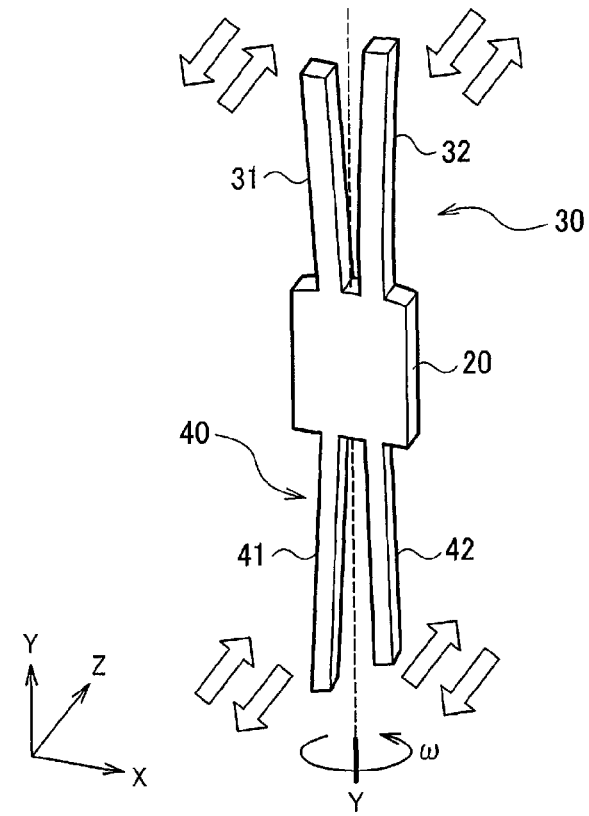
FIG. 3 is an operational diagram illustrating an out-of-plane vibration of the drive unit when an angular velocity is applied to the vibrating reed.

As illustrated in FIG. 3, when an angular velocity ω is applied to the vibrating reed 10 about the Y axis, the vibration direction of the drive unit 30 (the first and the second vibrating arms 31 and 32) is changed by the action of the Carioles force. The first and the second vibrating arms 31 and 32 oscillate around the center of mass of the base portion 20, that is, the so-called excited vibration in the walk mode occurs.

The excited vibration of the drive unit 30 (the first and the second vibrating arms 31 and 32) in the walk mode is propagated from the base portion 20 to the detection unit 40 (the third and the fourth vibrating arms 41 and 42). As a consequence, an excited vibration in the walk mode also occurs in the detection unit 40 (the third and the fourth vibrating arms 41 and 42) around the center of mass of the base portion 20. Then, in the detection unit 40 (the third and the fourth vibrating arms 41 and 42), an electric field is generated by the piezoelectric effect, and electric charge is created.

2. Arrangement of Electrodes in Vibrating Reed 2. 1. Drive Unit

Figure 12:
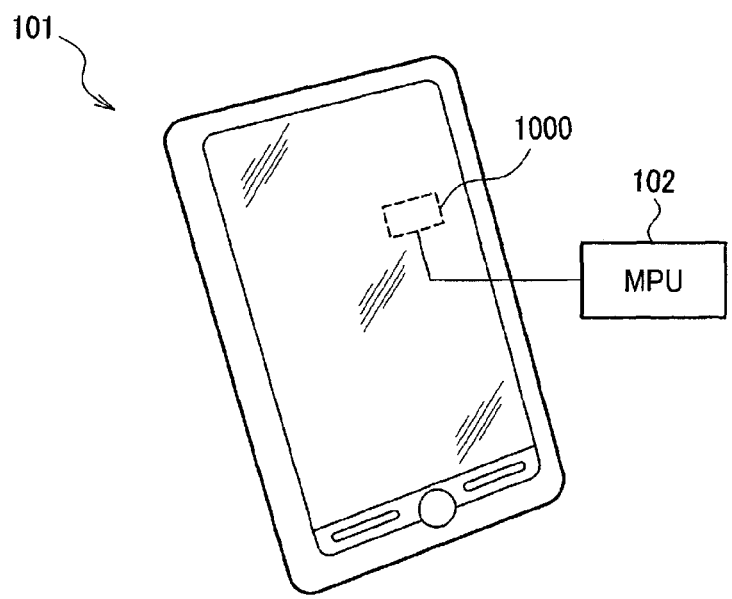
FIG. 12 is a diagram illustrating an example of an electronic device including a gyro sensor.

In the present embodiment, arrangement of electrodes in the drive unit 30 (the first and the second vibrating arms 31 and 32) is not particularly restricted provided that the in-plane vibration in FIG. 2 is excited. The drive unit 30 (the first and the second vibrating arms 31 and 32) can include electrodes provided on four surfaces of each vibrating arm in the X-Z cross section as illustrated in FIG. 2 of JP-A-2011-141266. Alternatively, as illustrated in FIG. 12 of JP-A-2011-141266, a pair of electrodes may be formed by a single electrode provided on the inside surface and the groove bottom of the groove that is open to the main surface and a side surface electrode formed on the side surface.

2. 2. Detection Unit

Arrangement of electrodes in the detection unit 40 (the third and the fourth vibrating arms 41 and 42) is featured in the present embodiment. First of all, as illustrated in FIG. 1, the detection unit 40 (the third and the fourth vibrating arms 41 and 42) is provided with openings on the first main surface 11, and the groove 50 is provided underneath the openings with the longitudinal direction, the width direction, and the depth direction thereof respectively set as the Y axis direction, the X axis direction, and the Z axis direction.

Figure 4:
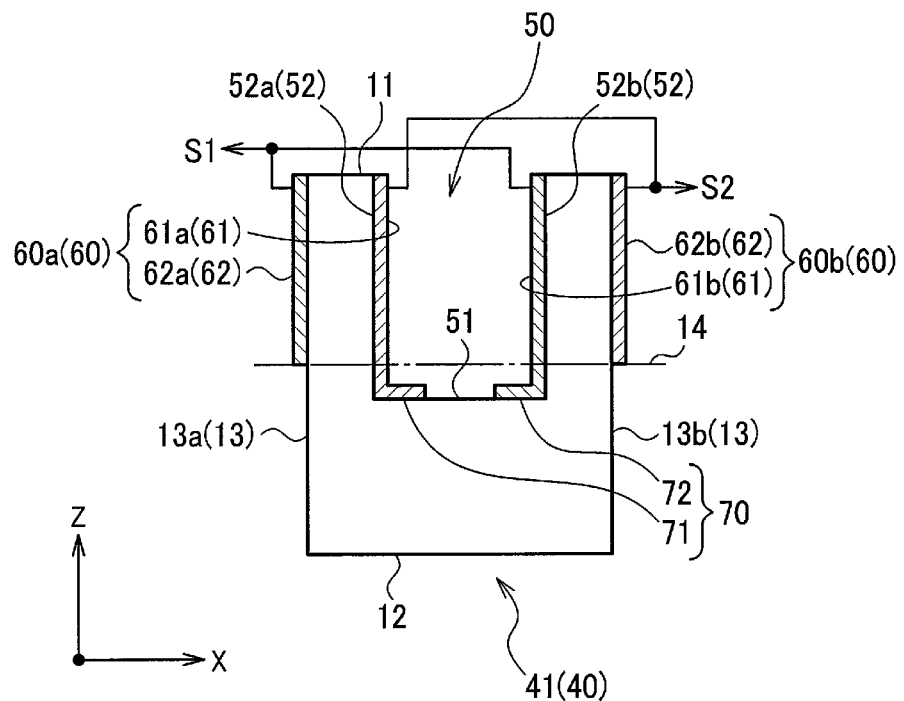
FIG. 4 is a diagram illustrating electrodes formed in the IV-IV cross section in FIG. 1.

FIG. 4 illustrates the IV-IV cross section in FIG. 1. In the X-Z cross section illustrated in FIG. 4, the groove 50 has the groove bottom 51 positioned beyond the midline 14 between the first main surface 11 and the second main surface 12 in the depth direction (the Z direction) from the first main surface 11. The groove 50 has inside surfaces 52 (a first inside surface 52a and a second inside surface 52a) that face each other across the inside of the groove 50 in the width direction X of the groove 50. The groove 50 can be formed similarly to the formation of the exterior of the vibrating reed 10, for example, by dry etching or particularly anisotropic etching.

The detection unit 40 (the third and the fourth vibrating arms 41 and 42) detects electric charge that is generated by an electric field caused by the piezoelectric effect and formed in the X direction by the vibration in the walk mode illustrated in FIG. 3. For that, pairs of electrodes are provided that face each other in the X direction. One of the pairs of electrodes is a pair of side surface electrodes 60 formed by an inside surface electrode 61 that faces the inside of the groove 50 and is formed on the inside surface 52 and an outside surface electrode 62 that is formed on the outside surface 13 which are opposite the inside surface 52. The other of the pairs of electrodes is a pair of groove bottom electrodes 70 that is provided further on the groove bottom 51 side than the midline 14 in the width direction X of the groove at an interval and that faces the inside of the groove 50. When favorable anisotropy is not made during formation of the groove 50, for example, using etching, the groove bottom 51 may not be formed to be flat as illustrated in FIG. 3; and thus, the pair of groove bottom electrodes 70 may not be formed on the groove bottom. 51. Even in this case, the pair of groove bottom electrodes 70 may be formed on the inclined inside surface that is further on the groove bottom 51 side than the midline 14 in the width direction X of the groove at an interval.

The pair of side surface electrodes 60 can include a first pair of side surface electrodes 60*a* and a second pair of side surface electrodes 60*b*. The outside surface 13 that is opposite the first inside surface 52*a* with the piezoelectric body interposed there between is referred to as a first outside surface 13*a*. The outside surface 13 that is opposite the second inside surface 52*b* with the piezoelectric body interposed there between is referred to as a second outside surface 13*b*. The inside surface electrode 61 can include a first inside surface electrode 61*a* formed on the first inside surface 52*a* and a second inside surface electrode 61*b* formed on the second inside surface 52*b*. The outside surface electrode 62 can include a first outside surface electrode 62*a* formed on the first outside surface 13*a* and a second outside surface electrode 62*b* formed on the second outside surface 13*b*. The first pair of side surface electrodes 60*a* is configured of the first inside surface electrode 61*a* and the first outside surface electrode 62*a*. The second pair of side surface electrodes 60*b* is configured of the second inside surface electrode 61*b* and the second outside surface electrode 62*b*.

The pair of groove bottom electrodes 70 includes a first groove bottom electrode 71 and a second groove bottom electrode 72 provided on the groove bottom 51 of the groove 50 in the width direction X of the groove at an interval. The first groove bottom electrode 71 positioned close to the first inside surface electrode 61*a* is connected to the first inside surface electrode 61*a*. That is, the first groove bottom electrode 71 is connected to the first inside surface electrode 61*a* at a corner of the groove 50 on the groove bottom. Similarly, the second groove bottom electrode 72 positioned close to the second inside surface electrode 61*b* is connected to the second inside surface electrode 61*b*. That is, the second groove bottom electrode 72 is connected to the second inside surface electrode 61*b* at a corner of the groove 50 on the groove bottom. The first and the second inside surface electrodes 61*a* and 61*b* and the first and the second groove bottom electrodes 71 and 72 can be formed by forming a conductive film on the entire surface inside the groove 50 with a sputtering process and the like and then removing unnecessary part with an etching process.

Output terminals S1 and S2 of the detection unit 40 are provided in the vibrating reed 10 as illustrated in FIG. 4. The output terminal S1 is connected to the first outside surface electrode 62*a*, the second inside surface electrode 61*b*, and the second groove bottom electrode 72. The output terminal S2 is connected to the second outside surface electrode 62*b*, the first inside surface electrode 61*a*, and the first groove bottom electrode 71.

3. Detection Operation

Figure 5:
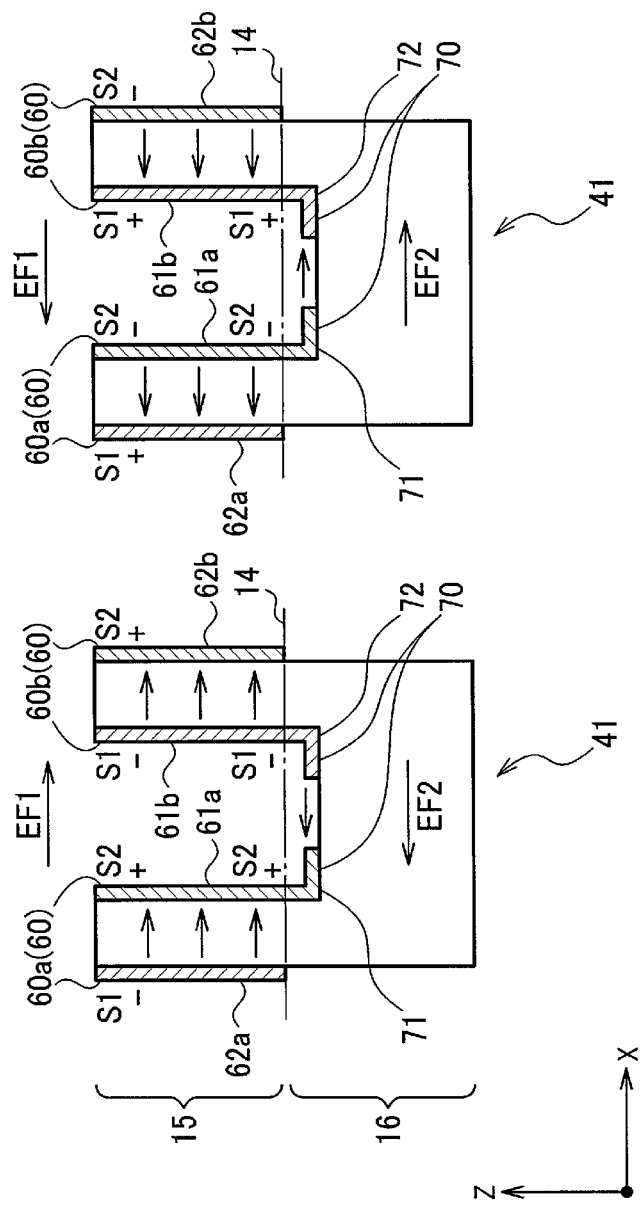
FIGS. 5A and 5B are diagrams illustrating the direction of electric fields that are alternately generated in the detection unit which vibrates in the walk mode.

FIGS. 5A and 5B illustrate the polarity of electric charge generated in the pair of electrodes while the detection unit 40 vibrates in the walk mode as illustrated in FIG. 3. FIG. 5A illustrates the detection unit 40 displaced, for example, in the +Z direction in FIG. 3. FIG. 5B illustrates the detection unit 40 displaced, for example, in the −Z direction in FIG. 3.

In the third vibrating arm 41 (the detection unit 40) vibrating along the Z direction, a compressive force is applied to one of two areas 15 and 16 and a tensile force is applied to the other of the two areas 15 and 16. The two areas 15 and 16 are divided from each other by the midline 14 in the thickness direction Z as illustrated in FIGS. 5A and 5B. The midline 14 here is a plane where none of compression and tension occurs. The midline 14 is set to be at the position that bisects the detection unit 40 in the thickness direction Z if the cross section of the detection unit 40 is rectangular. However, the cross section of the detection unit 40 is not limited to a rectangle provided that the cross section is ax symmetric about the Z axis. An electric field generated in response to the compressive force and the tensile force acts in the pairs of electrodes 60 and 70 formed in the third vibrating arm 41 (the detection unit 40). At this time, the direction of the electric field caused by the compressive force is opposite to the direction of the electric field caused by the tensile force.

In the horizontal cross section (the X-Z plane) of the third vibrating arm 41 (the detection unit 40) that is orthogonal to the thickness direction Z, given that a first direction is the direction of a first electric field EF1 generated in the pair of side surface electrodes 60 illustrated in FIGS. 5A and 5B, the direction of a second electric field EF2 that is generated in the pair of groove bottom electrodes is a second direction which is opposite to the first direction.

As illustrated in FIG. 5A, when the first inside surface electrode 61*a* is positioned downstream of the first electric field EF1, the first groove bottom electrode 71 of the pair of groove bottom electrodes 70 that is close to the first inside surface electrode 61*a* is positioned downstream of the second electric field EF2. Similarly, in FIG. 5A, when the second inside surface electrode 61*b* is positioned upstream of the first electric field EF1, the second groove bottom electrode 72 of the pair of groove bottom electrodes 70 that is close to the second inside surface electrode 61*b* is positioned upstream of the second electric field EF2. Therefore, two connected electrodes (61*a* and 71 or 61*b* and 72) together are positioned downstream or upstream of the direction of the electric fields. That is, the output terminal 51 outputs electric charge having the same polarity, negative polarity (refer to FIG. 5A) or positive polarity (refer to FIG. 5B), from the first outside surface electrode 62*a*, the second inside surface electrode 61*b*, and the second groove bottom electrode 72. Similarly, the output terminal S2 outputs electric charge having the same polarity, positive polarity (refer to FIG. 5A) or negative polarity (refer to FIG. 5B), from the second outside surface electrode 62*b*, the first inside surface electrode 61*a*, and the first groove bottom electrode 71. For this reason, electric charge loss caused by the electric fields does not occur. Accordingly, the area of electrodes can be enlarged by the electrodes 61, 71, and 72 that are formed on the inside surface 52 and the groove bottom 51 of the groove 50. Furthermore, detection sensitivity can be improved since electric charge loss does not occur.

The fourth vibrating arm 42 of the detection unit 40 also have a cross-sectional structure similar to that in FIG. 4. However, the connection of the electrodes of the fourth vibrating arm 42 to the output terminals S1 and S2 is opposite to that in FIG. 4 since a phase difference between the vibrations of the third and the fourth vibrating arms 41 and 42 are 180 degrees as illustrated in FIG. 3. That is, the output terminal S2 of the fourth vibrating arm 42 is connected to the first outside surface electrode 62a, the second inside surface electrode 61b, and the second groove bottom electrode 72. The output terminal S1 is connected to the second outside surface electrode 62b, the first inside surface electrode 61a, and the first groove bottom electrode 71. The same is also applied to modification examples (FIGS. 9 to 11) described below.

Figure 6:
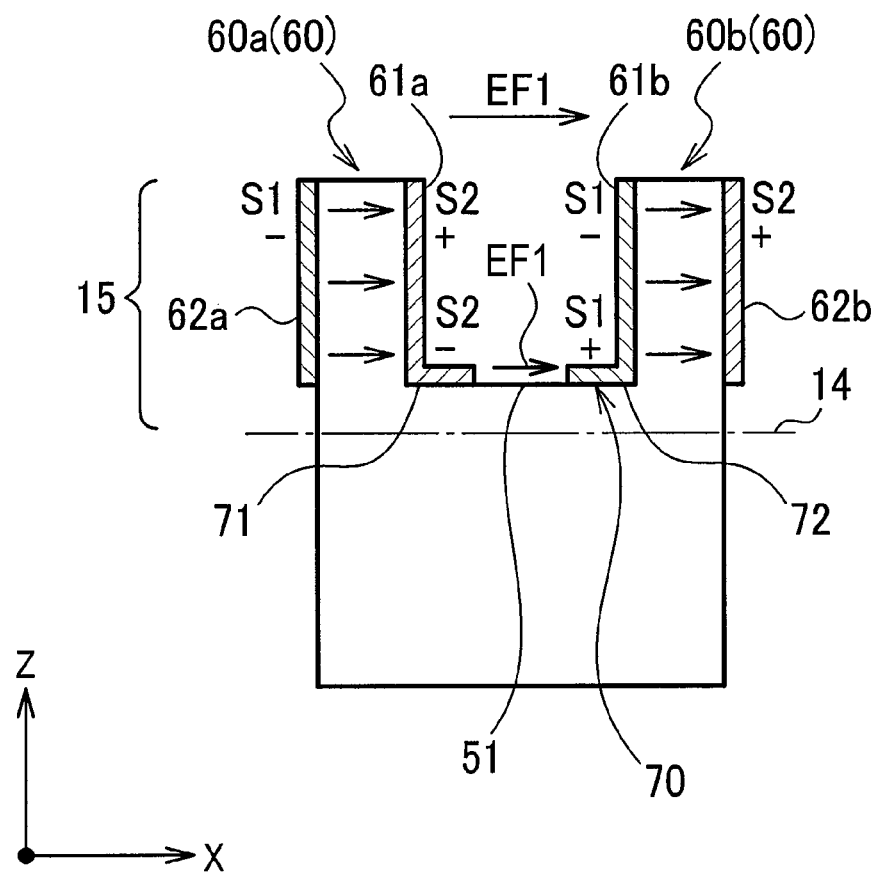
FIG. 6 is a diagram illustrating a comparative example in which electric charge loss occurs.

Operational effect of the present embodiment described above can be more apparent by comparing with a comparative example illustrated in FIG. 6. The groove 50 illustrated in FIG. 6 is different from that in the embodiment illustrated in FIGS. 4, 5A, and 5B in that the groove bottom 51 is formed in an area 15 that is positioned upper than the midline 14 in the thickness direction Z. In this case, only the first electric field EF1 is generated in the pair of side surface electrodes 60 (the first and the second pair of side surface electrodes 60a and 60b) and the pair of groove bottom electrodes 70 that are arranged in the area 15.

In FIG. 6, when the first inside surface electrode 61a is positioned downstream of the first electric field EF1, the first groove bottom electrode 71 of the pair of groove bottom electrodes 70 that is close to the first inside surface electrode 61a is positioned upstream of the first electric field EF1. Accordingly, positive surface electric charge is generated in the first inside surface electrode 61a, whereas negative surface electric charge is generated in the first groove bottom electrode 71 that is connected to the first inside surface electrode 61a. Similarly, when the second inside surface electrode 61b is positioned upstream of the first electric field EF1, the second groove bottom electrode 72 of the pair of groove bottom electrodes 70 that is close to the second inside surface electrode 61b is positioned downstream of the first electric field EF1. Accordingly, two connected electrodes (61a and 71 or 61b and 72) are differently positioned downstream or upstream of the direction of the electric field. That is, the positive surface electric charge generated in the first inside surface electrode 61a is lost by the negative surface electric charge generated in the first groove bottom electrode 71 in the output terminal S1. Similarly, the negative surface electric charge generated in the second inside surface electrode 61b is lost by the positive surface electric charge generated in the second groove bottom electrode 72 in the output terminal S2.

In the present embodiment, it is preferable that at least one of the first outside surface electrode 62a and the second outside surface electrode 62b be formed in an area from the first main surface 11 to the midline 14 in the thickness direction Z as illustrated in FIGS. 4, 5A, and 5B.

By doing so, counter electrodes are not formed across the two areas 15 and 16 divided from each other by the midline 14 in at least one of the first pair of side surface electrodes 60a and the second pair of side surface electrodes 60b. Accordingly, the electric field generated in at least one of the first pair of side surface electrodes 60a and the second pair of side surface electrodes 60b has one direction, and electric charge loss does not occur. Therefore, detection sensitivity can be improved. However, the first outside surface electrode 62a and the second outside surface electrode 62b may be arranged across the two areas 15 and 16 in FIG. 4.

4. Gyro sensor (Angular Velocity Sensor)

Figure 7:
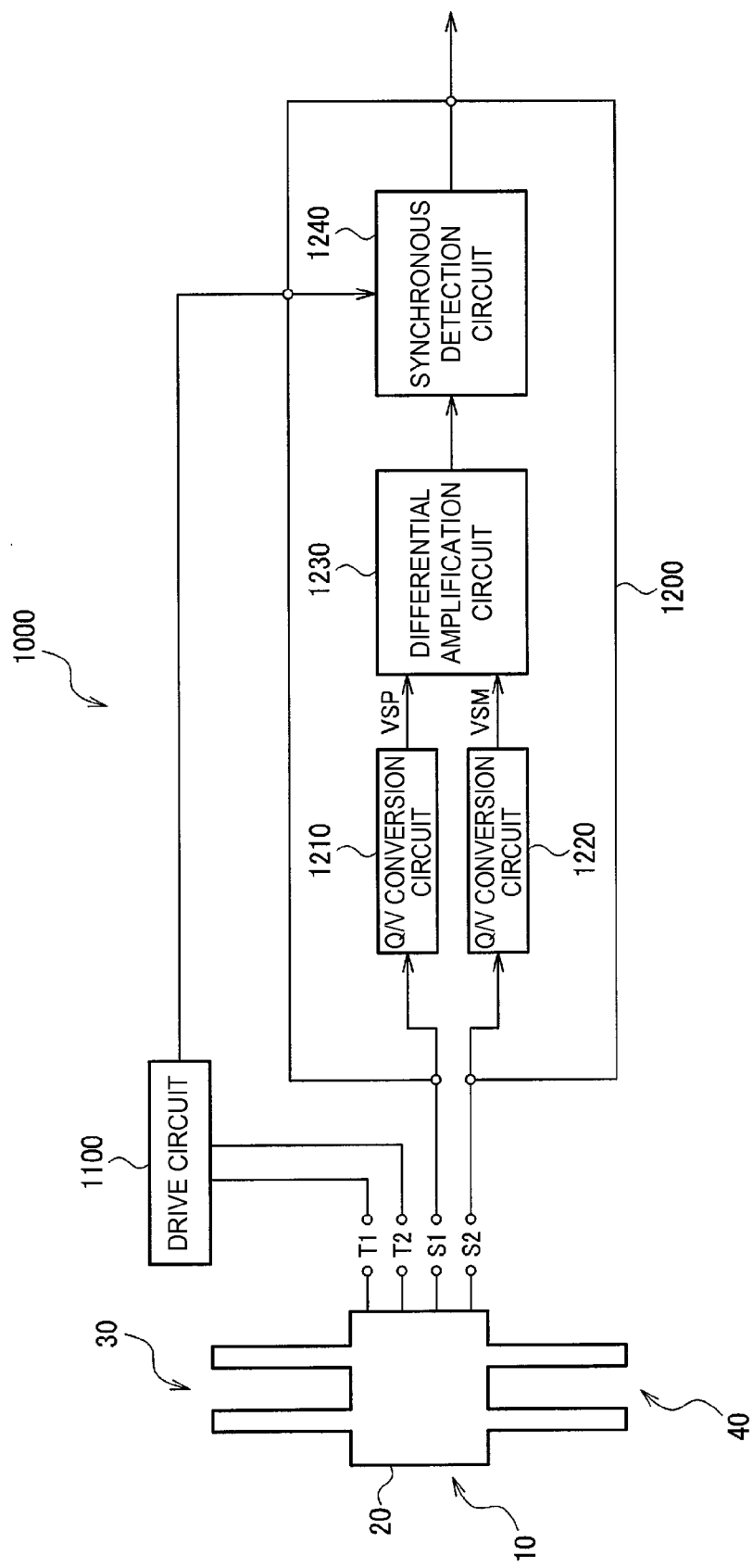
FIG. 7 is a schematic block diagram illustrating a gyro sensor that includes the vibrating reed and a detection circuit.

FIG. 7 is a schematic block diagram of a gyro sensor 1000. The gyro sensor 1000 includes the vibrating reed 10, a drive circuit 1100, and a detection circuit 1200. Drive terminals T1 and T2 and the output terminals S1 and S2 are provided in the vibrating reed 10, for example, in the base portion 20. The drive terminals T1 and T2 are connected to the drive circuit 1100, and the output terminals S1 and S2 are connected to the detection circuit 1200. The drive circuit 1100 supplies a drive signal to the drive terminals T1 and T2 and then causes the drive unit 30 to be subjected to an in-plane vibration by the piezoelectric effect, as illustrated in FIG. 2.

Figure 8:
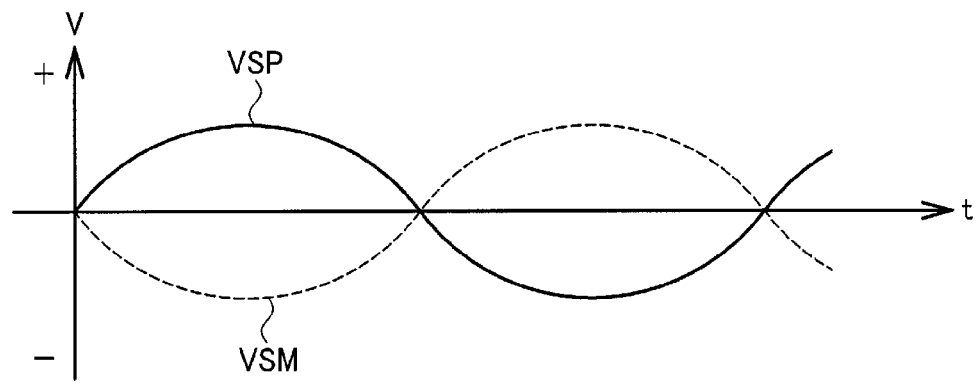
FIG. 8 is a diagram illustrating an alternating current voltage signal generated in the detection circuit.

The detection circuit 1200 includes two Q/V conversion circuits (also referred to as QV amps) 1210 and 1220. Alternating current electric charge that is generated in each of the electrodes in the vibrating reed 10 is input to the two QV amps 1210 and 1220 through the output terminals S1 and S2 of the vibrating reed 10, and is then converted to alternating current voltage signals VSP and VSM. The alternating current electric charge from the output terminal S1 and the alternating current electric charge from the output terminal S2 has a phase difference of 180 degrees between each other and have the same amplitude. Accordingly, as illustrated in FIG. 8, the QV amps 1210 and 1220 output the alternating current voltage signals VSP and VSM that have a phase difference of 180 degrees and have the same amplitude by configuring the QV amps 1210 and 1220 to have the same circuit and the same layout. The amplitude of the alternating current voltage signals VSP and VSM changes depending on the magnitude of the Carioles force (the magnitude of the angular velocity) that is applied to the vibrating reed 10. Furthermore, the amplitude of the alternating current voltage signals VSP and VSM can be increased since electric charge loss can be reduced as described above in the present embodiment.

A differential amplification circuit 1230 differentially amplifies the output signals of the QV amps 1210 and 1220 in the detection circuit 1200. Consequently, signals having the amplitude thereof twice as much as each amplitude of the alternating current voltage signals VSP and VSM are generated. Then, a synchronous detection is performed by a synchronous detection circuit 1240 based on a reference signal output from the drive circuit 1100. Accordingly, only an angular velocity component is detected, and a signal (an angular velocity signal) with a voltage level corresponding to the magnitude of the angular velocity is generated. The angular velocity signal is output to an external portion through an external output terminal. For example, the angular velocity signal is A/D converted in a microcomputer and used in various processes as angular velocity data. An A/D converter may be built in the detection circuit 1000 so that digital data representing the angular velocity is output to the external portion, for example, through a serial interface.

5. Modification Examples of Vibrating Reed

Figure 9:
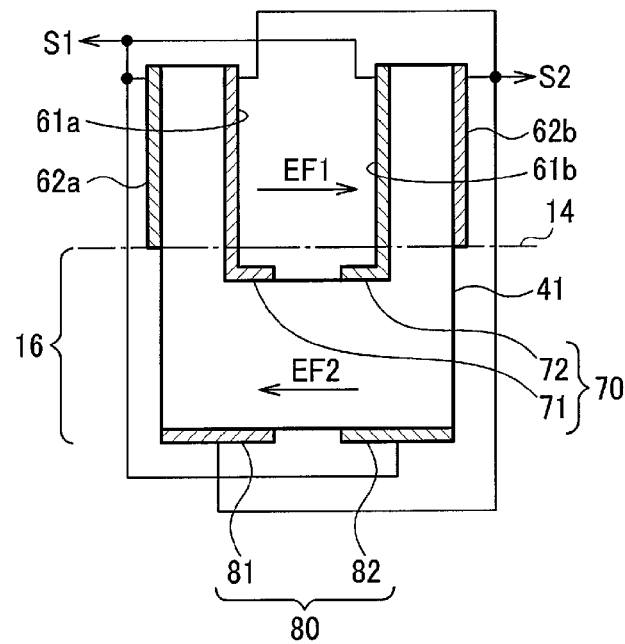
FIG. 9 is a diagram illustrating a modification example of a vibrating reed including a pair of main surface electrodes.
Figure 10:
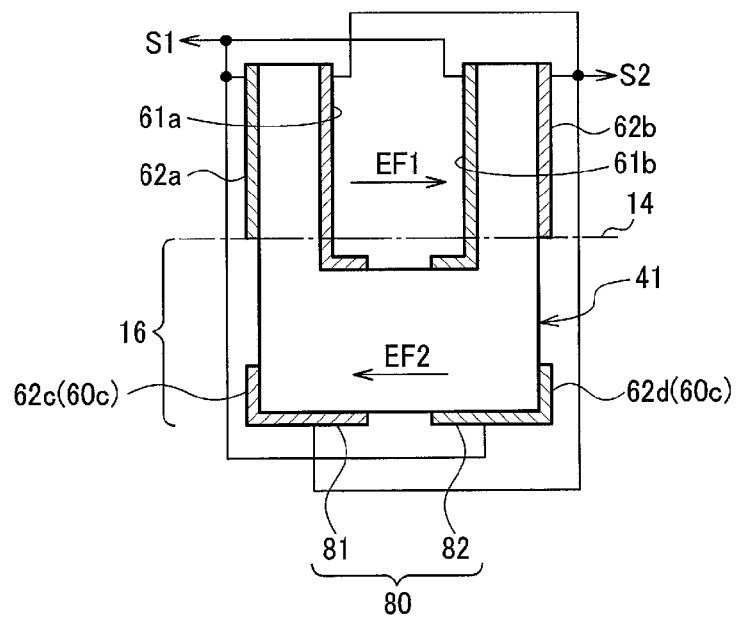
FIG. 10 is a diagram illustrating a modification example of a vibrating reed including a third pair of side surface electrodes.
Figure 11:
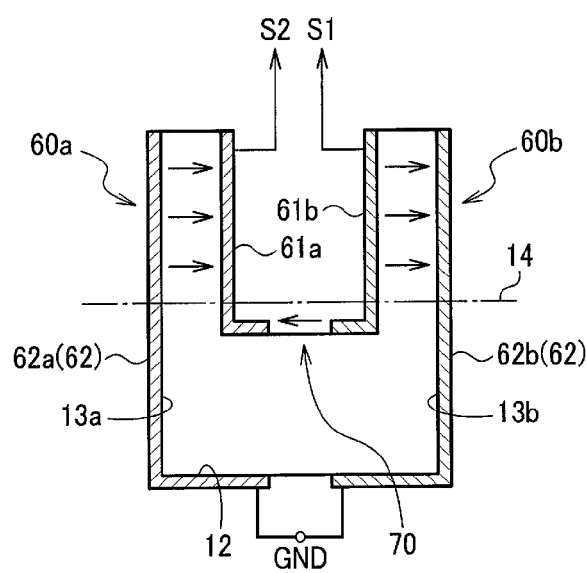
FIG. 11 is a diagram illustrating a modification example of a vibrating reed of which an outside surface electrode is grounded.

FIGS. 9 to 11 illustrate modification examples of arrangement of electrodes formed in the vibrating reed 10. The detection unit 40 (the third vibrating arm 41) illustrated in FIG. 9 further includes a pair of main surface electrodes 80 that is formed by a first main surface electrode 81 and a second main surface electrode 82 and arranged on the second main surface 12 at an interval. The first main surface electrode 81 is connected to the output terminal S2 that is connected to the first groove bottom electrode 71. The second main surface electrode 82 is connected to the output terminal S1 that is connected to the second groove bottom electrode 72.

Since the pair of main surface electrodes 80 and the pair of groove bottom electrodes 70 is positioned together in the second area 16 that is one side of the midline 14, the direction of the second electric field EF2 generated during detection is the same in both pairs of electrodes. Accordingly, electric charge loss does not occur even when the first main surface electrode 81 and the first groove bottom electrode 71 are connected to each other, and the second main surface electrode 82 and the second groove bottom electrode 72 are connected to each other. The area of electrodes is also enlarged since the pair of main surface electrodes 80 is additionally provided; therefore, the amount of electric charge can be increased.

The detection unit 40 (the third vibrating arm 41) illustrated in FIG. 10 further includes, in addition to the pair of main surface electrodes 80 illustrated in FIG. 9, a third pair of side surface electrodes 60c that is opposite each other with the piezoelectric body interposed there between in an area from the midline 14 to the second main surface 12 in the thickness direction Z. The third pair of side surface electrodes 60c includes a third outside surface electrode 62c that is formed on the first outside surface 13a and is connected to the first main surface electrode 81 and a fourth outside surface electrode 62d that is formed on the second outside surface 13b and is connected to the second main surface electrode 82.

In FIG. 10, since the third pair of side surface electrodes 60c, the pair of main surface electrodes 80, and the pair of groove bottom electrodes 70 are positioned in the area 16 that is one side of the midline 14, the direction of the second electric field EF2 generated therein during detection is all the same. Accordingly, electric charge loss does not occur even with the above conduction relationship.

Each of the first outside surface electrode 62a and the second outside surface electrode 62b is used as a ground electrode in the detection unit 40 (the third vibrating arm 41) illustrated in FIG. 11. In FIG. 11, the outside surface electrode 62 is formed on the first outside surface 13a, the second outside surface 13b, and the second main surface 12. The outside surface electrode 62 is used as a ground electrode.

As illustrated in FIG. 11, the direction of the electric fields generated in the first and the second pair of side surface electrodes 60a and 60b and the pair of groove bottom electrodes 70 is the same as that in FIG. 4 even when the outside surface electrode 62 is used as a ground electrode. Therefore, electric charge loss does not occur. Furthermore, the grounded outside surface electrode 62 (the first outside surface electrode 62a and the second outside surface electrode 62b) can shield the first inside surface electrode 61a, the second inside surface electrode 61b, and the pair of groove bottom electrodes 70; and thus, adverse effects from external noise can be reduced.

6. Electronic Device and Moving object

FIG. 12 schematically illustrates a Smartphone 101 as a specific example of an electronic device. The gyro sensor 1000 including the vibrating reed 10 is incorporated into the Smartphone 101. The gyro sensor 1000 can detect the position of the Smartphone 101. So-called motion sensing is implemented by the gyro sensor 1000. A detection signal from the gyro sensor 1000 can be supplied to, for example, a single-chip microcomputer (MPU) 102. The MPU 102 can run various processes in response to the motion sensing. Besides, the motion sensing can be used in various electronic devices such as mobile phones, mobile game consoles, game controllers, car navigation systems, pointing devices, head-mounted displays, and tablet computers.

Figure 13:
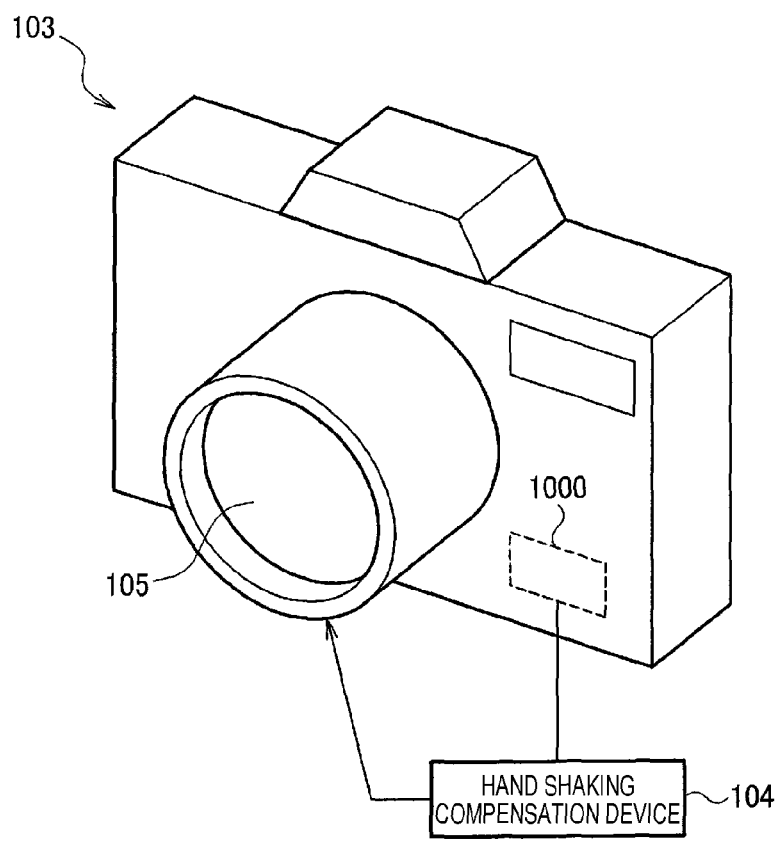
FIG. 13 is a diagram illustrating another example of an electronic device including a gyro sensor.

FIG. 13 schematically illustrates a digital still camera (hereinafter, referred to as "camera") 103 as another specific example of the electronic device. The gyro sensor 1000 including the vibrating reed 10 is incorporated into the camera 103. The gyro sensor 1000 can detect the position of the camera 103. The detection signal from the gyro sensor 1000 can be supplied to a hand shaking compensation device 104. The hand shaking compensation device 104 can move a specific lens in a lens set 105 in response to the detection signal from the gyro sensor 1000. This compensates for panning and tilting of the camera caused by shaking of hands. Besides, the hand shaking compensation can be used in digital video cameras.

Figure 14:
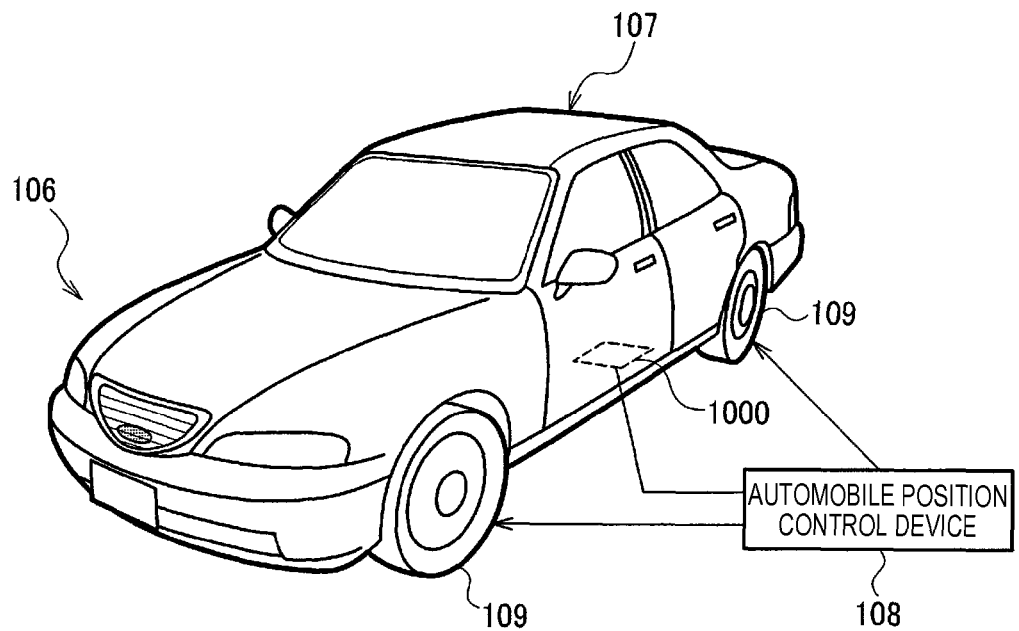
FIG. 14 is a diagram illustrating an example of a moving object including a gyro sensor.

FIG. 14 schematically illustrates an automobile 106 as a specific example of a moving object. The gyro sensor 1000 including the vibrating reed 10 is incorporated into the automobile 106. The gyro sensor 1000 can detect the position of a car body 107. The detection signal from the gyro sensor 1000 can be supplied to an automobile position control device 108. The automobile position control device 108 can control the softness and hardness of a suspension in response to the position of the car body 107 and control brakes for each wheel 109. Besides, the automobile position control can be used in various moving objects such as biped robots, airplanes, and helicopters.

The present embodiment has been described in detail as above. It is easily understood by those skilled in the art that various modifications can be made without substantially departing from the novelty and the effect of the invention. Accordingly, every such modification is included in the scope of the invention. For example, using a quartz crystal as the vibrating reed forming material has been described in the present embodiment and the modification examples above. However, other piezoelectric body materials besides the quartz crystal can be used. For example, aluminum nitride (Aln) or oxide substrates such as lithium neonate (LiNbO 3), lithium tantalite (LiTaO 3), lead zirconium titan ate (PZT), lithium tetraborate (Li2B4O7), and langasite (La3Ga5SiO14) substrates, laminated piezoelectric substrates configured by laminating a piezoelectric body material such as aluminum nitride and tantalum pent oxide (Ta2O5) on a glass substrate, or piezoelectric ceramics can be used. Terms used together with broader or heteronymous terms thereof at least once in the specification or the drawings can be replaced with the broader or the heteronymous terms at any place in the specification or the drawings. Configurations and operations of the gyro sensor 1000, the vibrating reed 10, the Smartphone 101, the camera 103, the automobile 106, and the like are not limited to the description in the present embodiment, and various modifications can be made.

The entire disclosure of Japanese Patent Application No. 2013-226032, filed Oct. 30, 2013 is expressly incorporated by reference herein.

What is claimed is:

1. A vibrating reed comprising:
   a first main surface and a second main surface of a piezoelectric body, the second main surface being on a back surface of the piezoelectric body with respect to the first main surface;

an outside surface that connects the first main surface and the second main surface; and a detection unit that vibrates along a direction intersecting the first main surface, wherein the detection unit includes
- a groove of which a groove bottom is at a position beyond a midline between the first main surface and the second main surface in a depth direction from an opening provided in the first main surface,
- an inside surface electrode that is provided on an inside surface facing the inside of the groove,
- an outside surface electrode that is provided on the outside surface, and
- a pair of groove bottom electrodes that are provided further on the groove bottom side than the midline at an interval and face each other inside the groove.

2. The vibrating reed according to claim 1, wherein the outside surface includes a first outside surface and a second outside surface, the inside surface includes a first inside surface that is provided on one side of the groove in a width direction and a second inside surface that is provided on the other side of the groove, the piezoelectric body is included between the first outside surface and the first inside surface, the piezoelectric body is included between the second outside surface and the second inside surface, the vibration reed further comprises:
- a first inside surface electrode and a first outside surface electrode that are respectively provided on the first inside surface and the first outside surface; and
- a second inside surface electrode and a second outside surface electrode that are respectively provided on the second inside surface and the second outside surface, and the pair of groove bottom electrodes includes a first groove bottom electrode and a second groove bottom electrode that are respectively connected to the first inside surface electrode and the second inside surface electrode.

3. The vibrating reed according to claim 2, wherein at least one of the first outside surface electrode and the second outside surface electrode is provided in an area from the first main surface to the midplane.

4. The vibrating reed according to claim 3, wherein the first outside surface electrode is connected to the second inside surface electrode, and the second outside surface electrode is connected to the first inside surface electrode.

5. The vibrating reed according to claim 3, wherein the detection unit further includes a first main surface electrode and a second main surface electrode that are formed on the second main surface at an interval, and the first main surface electrode is connected to the first groove bottom electrode, and the second main surface electrode is connected to the second groove bottom electrode.

6. An angular velocity sensor comprising:

the vibrating reed according to claim 3; and a detection circuit that detects an angular velocity on the basis of a vibration of the vibrating reed along the direction intersecting the first main surface.

7. An electronic device comprising the angular velocity sensor according to claim 6.

8. A moving object comprising the angular velocity sensor according to claim 6.

9. The vibrating reed according to claim 2, wherein the first outside surface electrode is connected to the second inside surface electrode, and the second outside surface electrode is connected to the first inside surface electrode.

10. The vibrating reed according to claim 2, wherein the detection unit further includes a first main surface electrode and a second main surface electrode that are formed on the second main surface at an interval, and the first main surface electrode is connected to the first groove bottom electrode, and the second main surface electrode is connected to the second groove bottom electrode.

11. The vibrating reed according to claim 10, wherein the detection unit further includes
- a third outside surface electrode that is provided in an area in the first outside surface from the midplane to the second main surface and is connected to the first main surface electrode, and
- a fourth outside surface electrode that is provided in an area in the second outside surface from the midline to the second main surface and is connected to the second main surface electrode.

12. The vibrating reed according to claim 2, wherein each of the first outside surface electrode and the second outside surface electrode is a ground electrode.

13. An angular velocity sensor comprising:

the vibrating reed according to claim 2; and a detection circuit that detects an angular velocity on the basis of a vibration of the vibrating reed along the direction intersecting the first main surface.

14. An electronic device comprising the angular velocity sensor according to claim 13.

15. A moving object comprising the angular velocity sensor according to claim 13.

16. An angular velocity sensor comprising:

the vibrating reed according to claim 1; and a detection circuit that detects an angular velocity on the basis of a vibration of the vibrating reed along the direction intersecting the first main surface.

17. An electronic device comprising the angular velocity sensor according to claim 16.

18. A moving object comprising the angular velocity sensor according to claim 16.

* * * * *